(12) United States Patent  
Moral et al.

(10) Patent No.: US 6,722,725 B1
(45) Date of Patent: Apr. 20, 2004

(54) DOOR TRIMMING FOR VEHICLES

(75) Inventors: Francisco Javier Martinez Moral, Burgos (ES); Yolanda Gonzalez Gil, Valladolid (ES); César Marcos Gonzalez, Burgos (ES); Michel Guerreau, Triel sur Seine (FR)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 09/959,305

(22) PCT Filed: Feb. 23, 2000

(86) PCT No.: PCT/ES00/00064

§ 371 (c)(1), (2), (4) Date: May 28, 2002

(87) PCT Pub. No.: WO01/62531

PCT Pub. Date: Aug. 30, 2001

(51) Int. Cl.⁷ ............................. B60J 5/04; B60J 10/08
(52) U.S. Cl. ................................. 296/146.7; 49/502
(58) Field of Search ....................... 296/146.7, 146.2; 49/502

(56) References Cited

U.S. PATENT DOCUMENTS

| | | | | |
|---|---|---|---|---|
| 5,345,720 A | * | 9/1994 | Illbruck et al. ............... | 49/502 |
| 5,584,144 A | * | 12/1996 | Hisano ......................... | 49/502 |
| 5,902,004 A | | 5/1999 | Waltz et al. | |
| 6,019,418 A | * | 2/2000 | Emerling et al. | |
| 6,139,088 A | * | 10/2000 | Okamoto et al. | |
| 6,233,875 B1 | * | 5/2001 | Carlo et al. ................... | 49/502 |
| 6,305,129 B1 | * | 10/2001 | Eckhardt et al. .............. | 49/502 |
| 6,354,653 B1 | * | 3/2002 | Seeberger et al. | |
| 6,409,250 B1 | * | 6/2002 | Schultheiss .............. | 296/146.7 |

FOREIGN PATENT DOCUMENTS

| | | |
|---|---|---|
| DE | 196 20 148 A1 | 11/1997 |
| ES | 2 107 268 | 11/1995 |
| ES | 2 116 785 | 9/1997 |
| WO | WO 99/11491 * | 3/1999 |

* cited by examiner

Primary Examiner—D. Glenn Dayoan
Assistant Examiner—Paul Chenevert
(74) Attorney, Agent, or Firm—Browdy and Neimark

(57) ABSTRACT

Door trim for vehicles, applicable to assembled units consisting of at least a door and a trim (1) fitted on to it, according to which the trim (1) features a concave area (8) which forms a dry area that is accessible mainly from the visible side of the trim and in which are housed, at the very least, the most important parts of the motor both during the assembly phase and throughout its useful life.

10 Claims, 5 Drawing Sheets

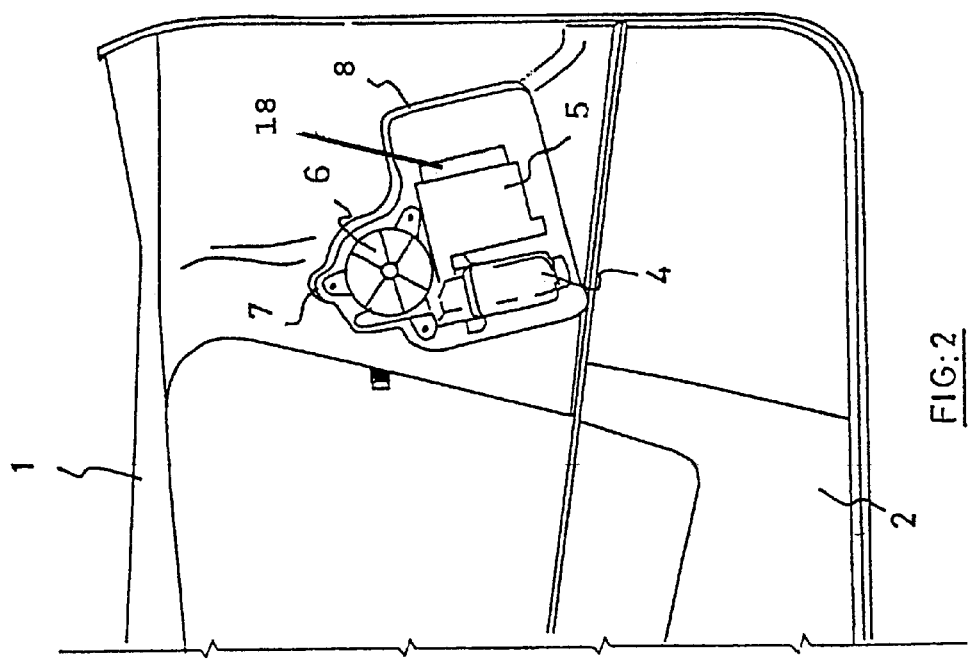
FIG:2
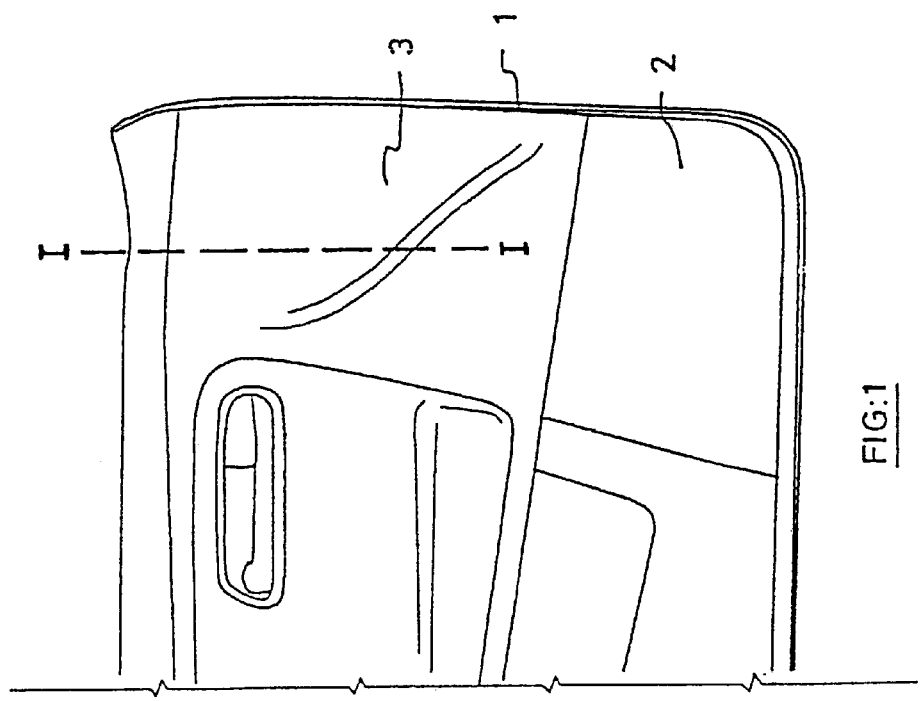
FIG:1

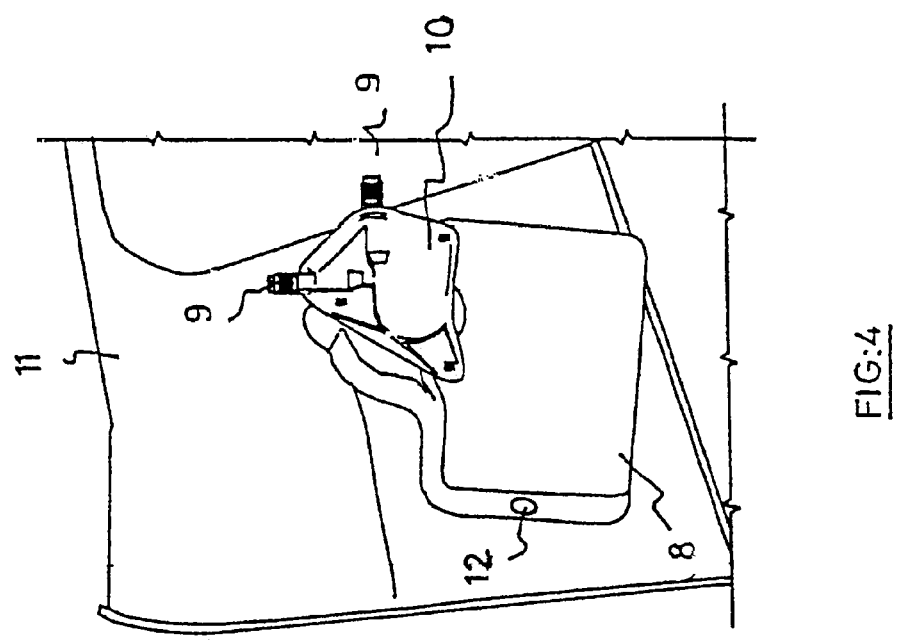
FIG:4
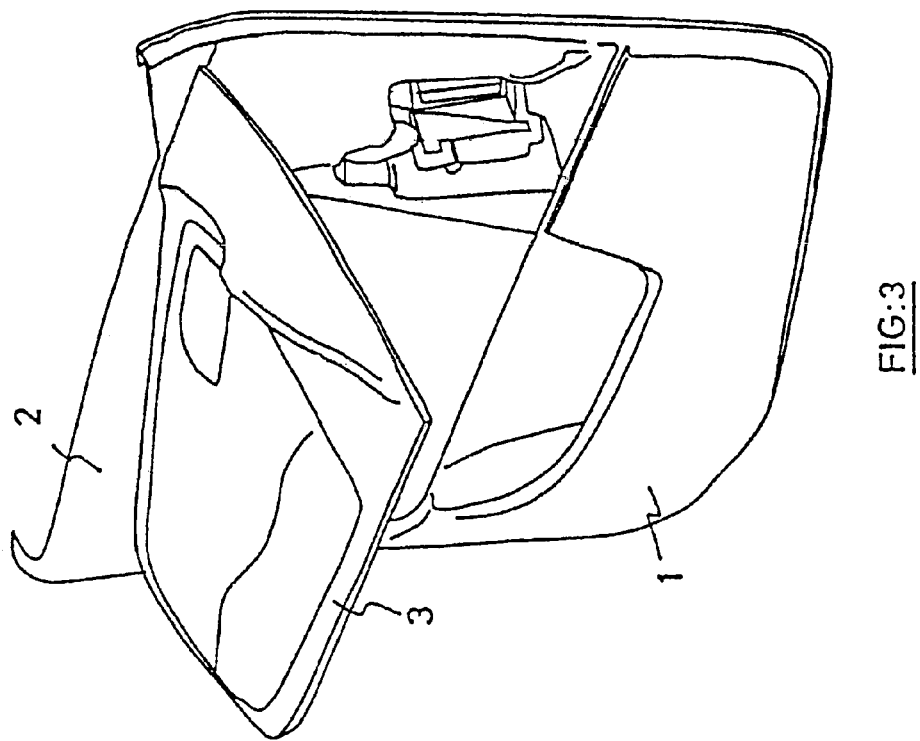
FIG:3

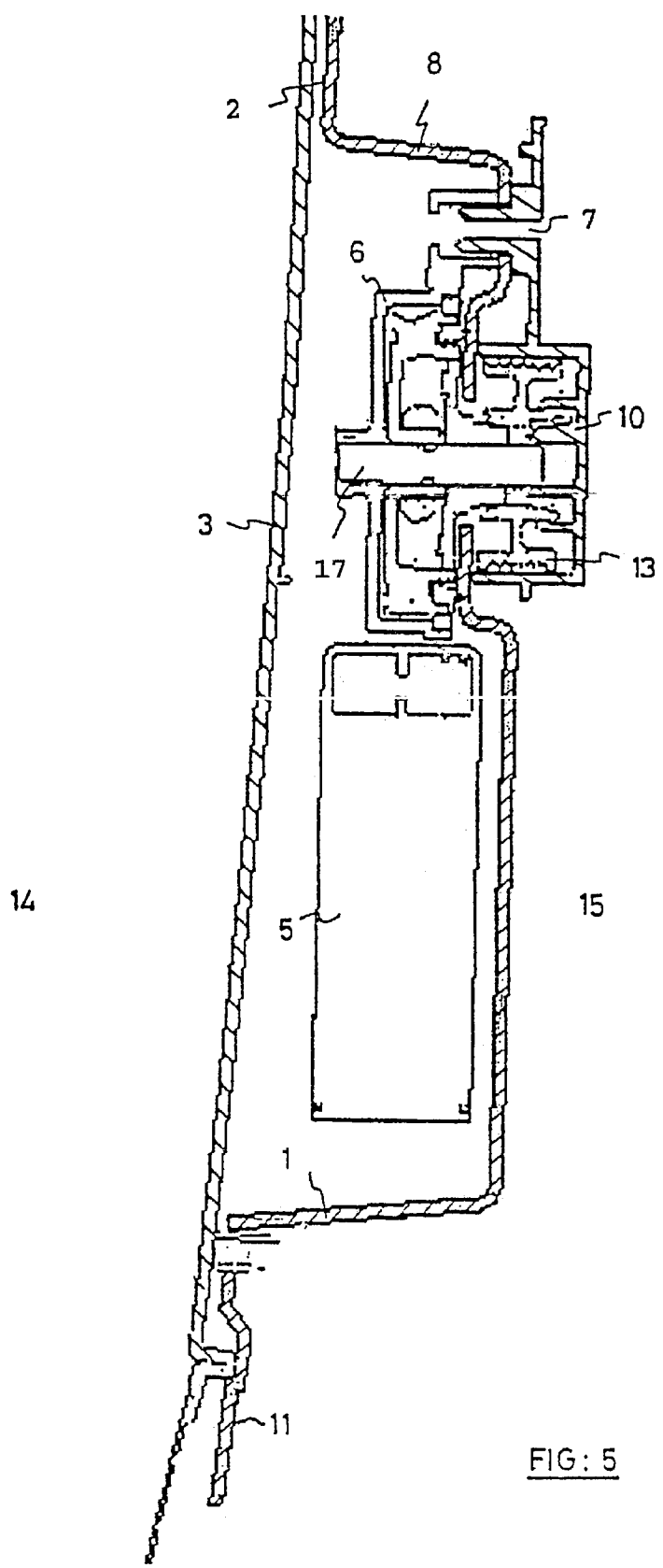
FIG: 5

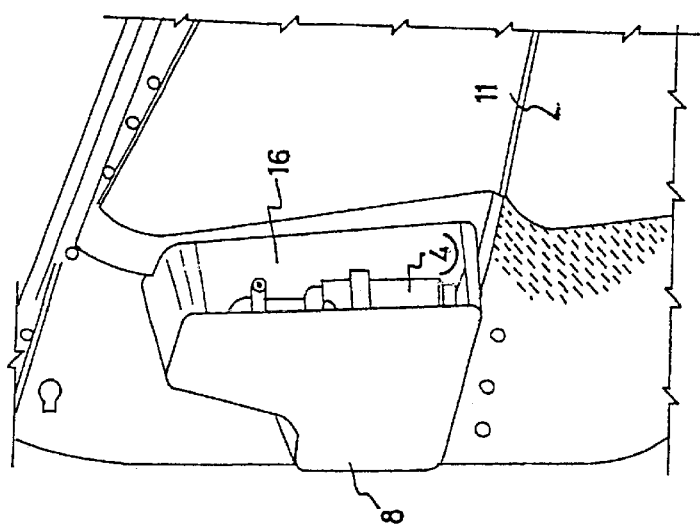
FIG:8
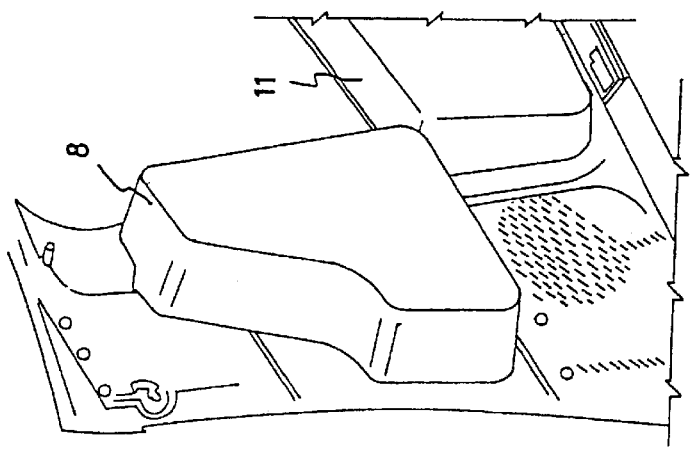
FIG:7
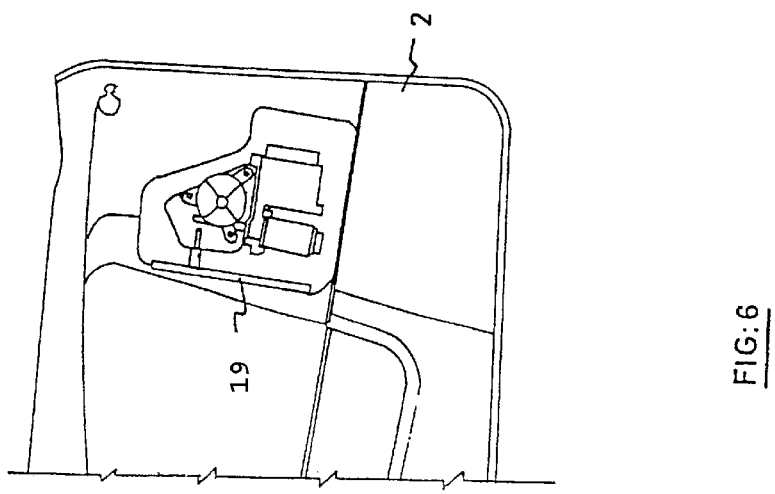
FIG:6

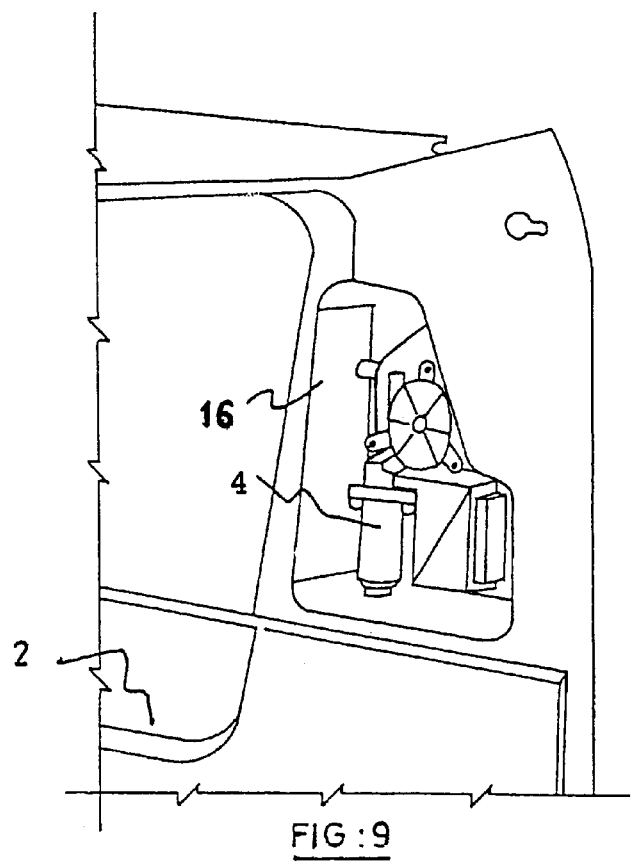
FIG:9
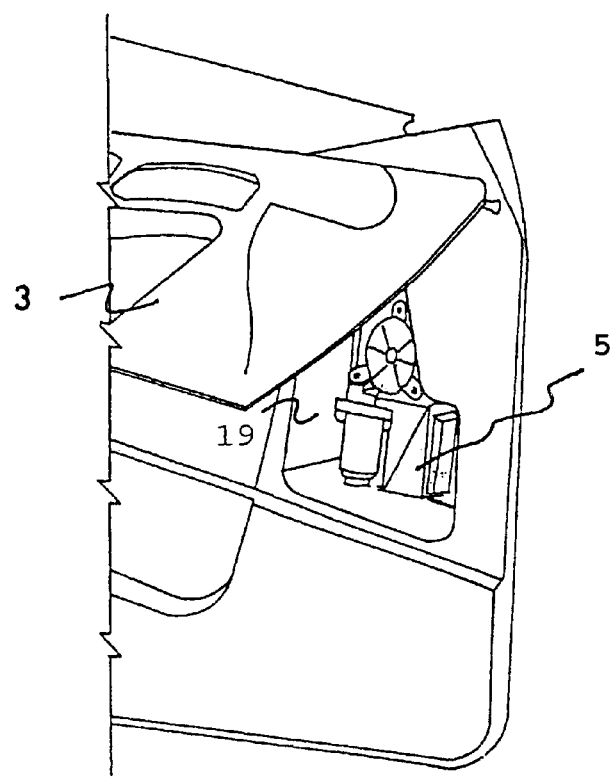
FIG:10

DOOR TRIMMING FOR VEHICLES

REFERENCE TO RELATED APPLICATIONS

The present application is the national stage under 35 U.S.C. §371 of international application PCT/ES00/00064, filed Feb. 23, 2000 which designated the United States, and which application was not published in the English language.

BACKGROUND OF THE INVENTION

TECHNICAL FIELD OF THE INVENTION

The invention concerns a door trim for vehicles which is fitted to the door of the motor vehicle and which incorporates the window winder motor.

PRIOR ART

In traditional systems, the window winder motor and other door components are fastened directly onto the inner covering of the door shell, i.e. they are bolted directly onto the steel sheet. A trim or decorative covering—what the user will see inside the vehicle—is then fitted over the unit.

The current trend is for modular solutions. These solutions are characterised by the fact that the window winder motor is fastened beforehand to a single part or module, which is then bolted to the door after being fitted on. This part also acts as a trim and can be termed as such.

Traditional door shells are exposed to incoming moisture and dirt and, logically, form a damp area. In order to prevent water and dust from getting inside the vehicle, various dust-tight and watertight systems are employed, such as the forming of holes on the unit to enable water to escape or the positioning of insulating material around the perimeter of the trim (thus forming a dry area between the steel sheet or the inner cover of the door shell and the trim). The dust-tight and watertight systems do not prevent, however, the window winder motor and other elements housed in the door shell from becoming exposed to a damp atmosphere and, as a result, from coming into contact with water.

There are modular systems in which, however, the window winder motor and other elements can be housed in the dry area, more precisely in the area between the inner covering of the door and the trim bolted to it (featuring the necessary insulating material, as in the previous example). The elements are arranged as follows: the motor, all the electronic components and the gear-motor system are housed in this dry area whereas the drum from which the window winder mechanism cables run and the drum cover are located in the damp area formed by the door shell. Logically, the holes linking the elements in both areas must be properly insulated.

There are a number of drawbacks associated with these solutions. First of all, the trim must be taken off in order to gain access to the motor. Secondly, a number of elements are required to make the unit dust-tight and watertight. Thirdly, the various elements on the module must be assembled in a number of operations beforehand.

OBJECT AND SUMMARY OF THE INVENTION

It is an object of this invention to provide a trim bearing the window winder motor in a dry area and which needs only a minimum number of requirements to protect it against moisture, reducing costs in the process.

Another object of this invention is to provide a trim which already has the window winder mechanism system fitted onto it, which would enable these operations to be carried out easily, quickly and ergonomically.

Another object of this invention is the fact that all the operations for the assembly of components on the trim can be removed from the vehicle-door assembly line, thereby saving the manufacturer time and space.

Another object of this invention is to make the motor dust-tight and watertight using only a very few elements in order to create a lighter and more economical unit.

Another object of this invention is to make the motor accessible without having to remove the trim completely, thereby making it easier to resolve problems in the event of the window becoming stuck at the top.

To attain these objectives, the invention claims a trim panel bearing the window winder motor, both during the fitting of the window winder mechanism unit onto the door and throughout its operating life. The motor is connected to the trim panel during the assembly phase and can be fastened either to the trim panel only or to the steel sheet through said trim panel.

According to the invention, this trim panel ensures that the motor is housed in the dry area with it being incorporated, regardless of how it is fastened, on the visible side or exterior of the trim panel. To achieve this, at least one part of this trim panel has been designed to conceal the motor, thereby ensuring that this part can easily be dismantled to provide access to the motor if the window winder mechanism malfunctions.

The door trim panel, regardless of the material it is made of, features a concave area on its visible side which is designed to house the vehicle's window winder motor specifically and the gear-motor system and electronic components at the very least. This concave area must be shaped in such a way that it can also house the connector linking the motor's electronic box to the wiring on the door.

The wiring runs from the non-visible side of the trim to the visible side through the concave area housing the motor and passes through a hole made in the trim itself, which is why bushing or a similar system guaranteeing the unit remains dust-tight and watertight is used.

The concave area forms a dry area in itself which completely insulates the elements it houses.

At the same time, the trim panel according to the invention features another portion situated on the outer side, i.e. the side visible from the inside of the passenger compartment of the vehicle, located above the concave area and concealing the elements housed inside it. This second portion of the trim panel is easy to close and open, as will be demonstrated later.

By this invention two practical solutions are envisaged and claimed, namely:
  A) One, the aforementioned solution, according to which the gear-motor unit, its electronic components and the connector are housed inside the dry area formed by the concave area on the trim panel.
  B) The other solution, according to which all the components of the window winder motor, including the connector linking the motor's electronic box to the wiring on the door are housed in the concave area on the trim panel.

In solution A the concave area comprises the gear-motor unit and its electronic components as well as the connector. The wiring for the motor passes through a hole featuring dust-tight and watertight bushing formed in the thickness of the trim panel to the interior of the concave area.

The drum holding the cable for the window winder mechanism is positioned on the non-visible side of the trim panel, outside the concave area and projecting towards the damp area. The interconnection is made through a hole in the thickness of the trim panel in the concave area, with the hole being made dust-tight and watertight by a gasket fitted on the motor itself as part of a manufacturing solution that is already on the market.

The other holes formed in the concave area allow the bolts connecting the drum cover to the rest of the motor and the whole of the system to the door trim panel or panel and steel sheet to pass through, with all these holes having been designed to be dust-tight and watertight.

The drum and its cover feature, logically, the outlets for the window winder mechanism cables.

In solution B, the concave area houses the window winder motor with all its components, with all these components situated, therefore, in the dry area.

As the drum holding the cables is on the visible side of the trim and the cables are on the unseen side, the concave area in this solution features a lateral aperture on one of its sides. The entire motor passes through this aperture to the outer side of the trim panel, leaving the rest of the window winder mechanism it is connected to on the other side.

In order to ensure the concave area is dust-tight and watertight, this lateral aperture must remain closed during the useful life of the unit, with only a few dust-tight and watertight holes being left for the outlets on the drum cover. The function of these holes is to guide these cables to the rest of the window winder system.

Two different means of closing off the unit in this way have been considered. One of them is based on a gasket and the other on a manufacturing solution. In this last version a projection on another part of the trim panel, such as the one concealing the concave area on the outside and the elements situated on the interior, can be provided in order to cover the open lateral.

This solution, B, has an additional advantage over solution A: the window winder mechanism can be adjusted before being fitted onto the trim panel.

BRIEF DESCRIPTION OF THE DRAWINGS

The plans attached show practical applications of the invention, details of which are provided below:

FIG. 1 is a partial elevation of the visible side of the trim panel with the closed cover concealing the concave area.

FIG. 2 shows the partial elevation of FIG. 1 without the cover.

FIG. 3 is a view of the visible side of the trim panel with the cover half open.

FIG. 4 is a view of the non-visible side of the trim panel.

FIG. 5 is a view of the cross section along the I—I line in FIG. 1.

FIG. 6 is an elevation of the visible side of the trim panel, without the cover, in the other variation of the invention.

FIG. 7 is a view of the non-visible side of the trim panel shown in FIG. 6.

FIG. 8 is another view of the non-visible side of the trim panel shown in FIG. 6.

FIG. 9 is a view of the visible side of the trim panel shown in FIG. 6.

FIG. 10 is a similar view to that of FIG. 9 with the cover half open.

DETAILED DESCRIPTION OF THE PREFERRED EMBODIMENT(S) OF THE INVENTION

In FIG. 1 we can see the trim panel (1) on its visible side (2) and the cover (3) concealing the concave area of the part. This is how the trim panel exterior appears from the inside of the vehicle passenger compartment.

When the cover is moved out of position, as shown in FIG. 2, the concave area (8) can be seen on the visible side (2), inside which can be seen the motor (4), the electronic box (5), and the gear-motor system (6) with the fastening points (7). To the right of the electronic box (5) there is a connector (18) to which the power cables will be connected.

In FIG. 3, the cover (3) of the trim panel (1) is shown half open, rotating on the visible side (2) of the trim panel (1).

The inner or non-visible side (11) of the trim panel is shown in FIG. 4 with the concave area (8) receiving the aforementioned elements seen from the other side. This is a view of the damp area. This figure shows the drum cover (10) and the outlet (9) receiving the cables for the window winder mechanism as well as the hole (12) allowing the entry of the electrical cables running to the connector housed inside the concave area (8).

With the invention being detailed in FIGS. 1 to 4, according to which some of the components are located in the damp area of the assembled unit, FIG. 5 details one way of assembling it.

This figure shows the dry area (14) and the damp area (15) of the unit. The trim panel (1) is seen on its visible side (2) and its cover (3) is shown facing the dry area (14) and its non-visible side (11) is shown facing the damp area (15).

The concave area (8) is formed from the visible side (2) of the trim panel (1) and is closed and concealed on the exterior (the inside of the vehicle) by the cover (3). It houses the following elements: in the dry area—the gear-motor unit (4, 6) and the electronic box (5); in the damp area—the drum (13) and the drum cover (10).

The drum cover (10) is fastened to the bottom of the concave area (8) by dust-tight and watertight holes or fastening points (7). The shaft (17) of gear-motor unit (4, 6) passes through the trim and is made dust-tight and watertight by a gasket on the motor itself.

FIG. 6 details a variation of the invention, according to which the motor and all its components are located inside the concave area (8), which opens out on the visible side (2). FIG. 6 also shows the lateral aperture (16) formed on the concave area itself to house the unit.

The views of the non-visible side (11) in FIGS. 7 and 8 enable the lateral aperture (16) in the concave area (8) to be viewed in greater detail. The function of this lateral aperture is to allow the wiring running from the connector and the drum to enter and to enable the window winder mechanism to be adjusted before the trim panel (1) is fitted on.

The view of the visible side (2) in FIG. 9 clearly shows the lateral aperture (16) formed in the concave area (8).

Finally, FIG. 10 details how the cover (3) conceals all the elements.

Cover (19) closes the lateral aperture (16) in the concave area (8). The cover (19) can be similar to the cover (3) or can consist of a dust-tight and watertight gasket to conceal the aperture, as mentioned above.

What is claimed is:

1. A trim panel adapted to engage at least one door of a vehicle, the trim panel being visible to an occupant inside a passenger compartment of the vehicle, and forming a barrier between a dry area (14) towards an interior of the vehicle and a damp area (15) towards an exterior of the vehicle, the trim panel (1) comprising:

a dust-tight and watertight concave area (8) housing at least a gear-motor unit (4, 6), an electronic box (5) for the gear-motor unit (4, 6) and an electrical connector (18) for power cables; wherein when the trim panel is fitted to the vehicle door the opening to the concave area (8) opens to an inside of the passenger compartment to provide a dry area after the gear-motor unit (4, 6), the electronic box (5) and the connector have been engaged in the concave area; and a cover (3) having an area less than that of the trim panel covering the opening to the concave area to conceal contents therein, the cover (3) also visible the occupant inside the passenger compartment.

2. The door trim panel in accordance with claim 1, wherein a coiling drum (13) for a window winder mechanism cable and a drum cover (10) of the gear-motor unit are located in the damp area adjacent to a non-visible side (11) of the trim panel, the trim panel having dust-tight and watertight holes to enable bolts securing the drum cover (10) and a shaft (17) of the gear-motor unit to pass through as well as the power cables leading to the connector.

3. The door trim panel in accordance with claim 2, wherein the drum cover (10) of the gear-motor unit has outlets (9) for the window winder mechanism cable.

4. The door trim panel in accordance with claim 1, wherein an area of the opening to the concave area is less than that of the trim panel.

5. A trim panel adapted to engage at least one door of a vehicle the trim panel being visible to an occupant inside a passenger compartment of the vehicle and forming a barrier between a dry area (14) towards an interior of the vehicle and a damp area (15) towards an exterior of the vehicle, the trim panel (1) comprising:

a dust-tight and watertight concave area (8) housing a window winder motor unit, a gear-motor unit (4, 6), an electronic box (5) for the gear-motor unit (4, 6), an electrical connector (18) for power cables, a coiling drum (13) and a drum cover (10), a surface of the concave area (8) having a lateral aperture (16);

wherein the trim panel is fitted to the vehicle door so that the opening to the concave area (8) opens to an inside of the passenger compartment to provide a dry area after the window winder motor unit, the gear-motor unit (4, 6), the electronic box (5) the electrical connector the cooling drum and the drum cover have been engaged in the concave area; and a cover (3) having an area less than that of the trim panel covering the opening to the concave area to conceal contents therein, the cover also being visible to the occupant inside the passenger compartment.

6. The door trim panel in accordance with claim 5, wherein the lateral aperture (16) enables the window winder mechanism to be adjusted before being fitted on.

7. The door trim panel in accordance with claim 5, wherein dust-tight and watertight holes allowing the passage of the electrical and drive cables and the elements securing the unit to the trim panel are formed in the concave area (8) and in a cover (19) of the lateral aperture (16).

8. The door trim panel in accordance with claim 5, wherein the lateral aperture (16) of the trim is sealed with a gasket.

9. The door trim panel in accordance with claim 5, wherein the lateral aperture (16) of the trim is sealed with a section of panel (19) similar to that concealing the unit on the outside.

10. The door trim panel in accordance with claim 5, wherein an area of the opening to the concave area is less than that of the trim panel.

* * * * *